United States Patent
Cheng et al.

(10) Patent No.: US 8,054,745 B2
(45) Date of Patent: Nov. 8, 2011

(54) CALL ADMISSION CONTROLLER AND METHOD THEREOF AND MULTI-HOP WIRELESS BACKHAUL NETWORK SYSTEM USING THE SAME

(75) Inventors: Ray-Guang Cheng, Keelung (TW); Ping-Chen Lin, Tainan (TW)

(73) Assignee: National Taiwan University of Science and Technology, Taipei (TW)

( * ) Notice: Subject to any disclaimer, the term of this patent is extended or adjusted under 35 U.S.C. 154(b) by 156 days.

(21) Appl. No.: 12/419,301

(22) Filed: Apr. 7, 2009

(65) Prior Publication Data
US 2010/0182906 A1    Jul. 22, 2010

(30) Foreign Application Priority Data
Jan. 19, 2009    (TW) ................................ 98101915 A

(51) Int. Cl.
    *H04J 1/16*  (2006.01)
(52) U.S. Cl. ........................................................ 370/230
(58) Field of Classification Search .................. 370/229, 370/230, 232, 233, 234, 310, 328
    See application file for complete search history.

(56) References Cited

U.S. PATENT DOCUMENTS

| | | | | |
|---|---|---|---|---|
| 5,953,318 A | * | 9/1999 | Nattkemper et al. | 370/236 |
| 2004/0190541 A1 | * | 9/2004 | Zhang | 370/431 |
| 2006/0189322 A1 | * | 8/2006 | Conte et al. | 455/453 |
| 2008/0002608 A1 | * | 1/2008 | Zheng et al. | 370/328 |
| 2008/0144497 A1 | * | 6/2008 | Ramprashad et al. | 370/230.1 |

* cited by examiner

*Primary Examiner* — Kwang B Yao
*Assistant Examiner* — Obaidul Huq
(74) *Attorney, Agent, or Firm* — Jianq Chyun IP Office

(57) ABSTRACT

A method for managing a call admission controller in a multi-hop wireless backhaul network is illustrated. The method provides a call access control mechanism in a multi-hop wireless backhaul network system by calculating at least one service quality parameter in the network and determining if service data transmitted from relay nodes is allowed to enter a gateway of the network according to the at least one service quality parameter. In exemplary embodiments of present invention, the service quality parameter includes a throughput, an average delay of packets, a number of remote devices, a packet loss rate, a number of the relay nodes, and an amount of service data of a specific class traffic in the network. A topology of the network may be a ring, a chain, or a tree topology, and a ripple protocol is utilized as media access control protocol in the network.

8 Claims, 8 Drawing Sheets

CALL ADMISSION CONTROLLER AND METHOD THEREOF AND MULTI-HOP WIRELESS BACKHAUL NETWORK SYSTEM USING THE SAME

CROSS-REFERENCE TO RELATED APPLICATION

This application claims the priority benefit of Taiwan application serial no. 98101915, filed on Jan. 19, 2009. The entirety of the above-mentioned patent application is hereby incorporated by reference herein and made a part of specification.

BACKGROUND OF THE INVENTION

1. Field of the Invention

The present invention generally relates to a multi-hop wireless backhaul network. More particularly, the present invention relates to a call admission controller and a call admission control method thereof for a multi-hop wireless backhaul network and a multi-hop wireless backhaul network thereof.

2. Description of Related Art

The technical development of wireless local area networks has gradually matured such that applications thereof have extended from being originally in small indoor areas to extensive outdoor environments. Since it is both time consuming and costly to lay out wired backhaul networks, wireless backhaul networks adopting wireless area networks as the technical background have gradually become an advantageous alternative to the wired backhaul networks. Coverage of a wireless area network is approximately 100 m. In order to achieve a wide coverage of the backhaul network, the wireless backhaul network adopts a method of using relay nodes to transfer with multi-hops and connect to a wired gateway and eventually to the Internet. In such a wireless backhaul network, a connection point which provides both access and relay functions is referred to as a relay node through which communication is transferred to an admission point, and the admission point is referred to as a gateway. The connection point and admission point mentioned below are referred to as a relay node and a gateway.

When laying out a wireless backhaul network in an outdoor environment, for the purpose of convenience in management of electrical interference and traffic flow, the most commonly adopted network topology is a chain topology. In the multi-hop wireless backhaul network, not only can data be transferred between relay nodes in a wireless manner but users within coverage of a relay node itself can also connect to the relay node in a wireless manner. The two wireless communication manners use different frequency bands and transmission interfaces to avoid causing tremendous interference. For example, connection between relay nodes or between a relay node and a gateway uses IEEE 802.11a protocol in a 5 GHz frequency band for communication while connection between a relay node and a user may adopt IEEE 802.11b/g protocol in a 2.4 GHz frequency band for communication.

Operation of the current multi-hop wireless backhaul network still lacks an efficient medium access control (MAC) protocol. In general, the multi-hop wireless backhaul network usually adopts a chain network topology and communication between relay nodes uses the distributed coordination function (DCF) medium access control protocol defined by the IEEE 802.11 standard. However, the currently adopted IEEE 802.11 DCF medium access control protocol results in the poor transmission rate, the serious problem of unfair efficiency, and inability to guarantee service quality.

SUMMARY OF THE INVENTION

According to an embodiment of the present invention, the present invention provides a call admission controller for a multi-hop wireless backhaul network which includes a plurality of relay nodes and a gateway and is disposed in the gateway. The call admission controller includes a service quality parameter calculating unit and a service quality parameter determining unit. The service quality parameter calculating unit is for calculating at least one service quality parameter of the multi-hop wireless backhaul network. The service quality parameter determining unit determines whether to allow service data transmitted by one of the relay nodes to enter the gateway according to at least one service quality parameter.

According to an embodiment of the present invention, the present invention further provides a call admission control method for a multi-hop wireless backhaul network which includes a plurality of relay nodes and a gateway. The call admission control method uses a service quality parameter calculating unit to calculate at least one service quality parameter, and uses a service quality parameter determining unit to determine whether to allow service data transmitted by one of the relay nodes to enter the gateway according to at least one service quality parameter.

According to an embodiment of the present invention, the present invention further provides a multi-hop wireless backhaul network which includes a plurality of relay nodes and a gateway. The gateway includes a call admission controller. The call admission controller includes a service quality parameter calculating unit and a service quality parameter determining unit. The service quality parameter calculating unit is for calculating at least one service quality parameter of the multi-hop wireless backhaul network. The service quality parameter determining unit determines whether to allow service data transmitted by one of the relay nodes to enter the gateway according to at least one service quality parameter.

Based on the above, in the embodiments of the present invention, a determination on whether to allow service data of a relay node to enter the gateway is made according to at least a service quality parameter of the multi-hop wireless backhaul network. Accordingly, capacity and overall efficiency of the multi-hop wireless backhaul network can be increased.

In order to make the aforementioned and other features of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
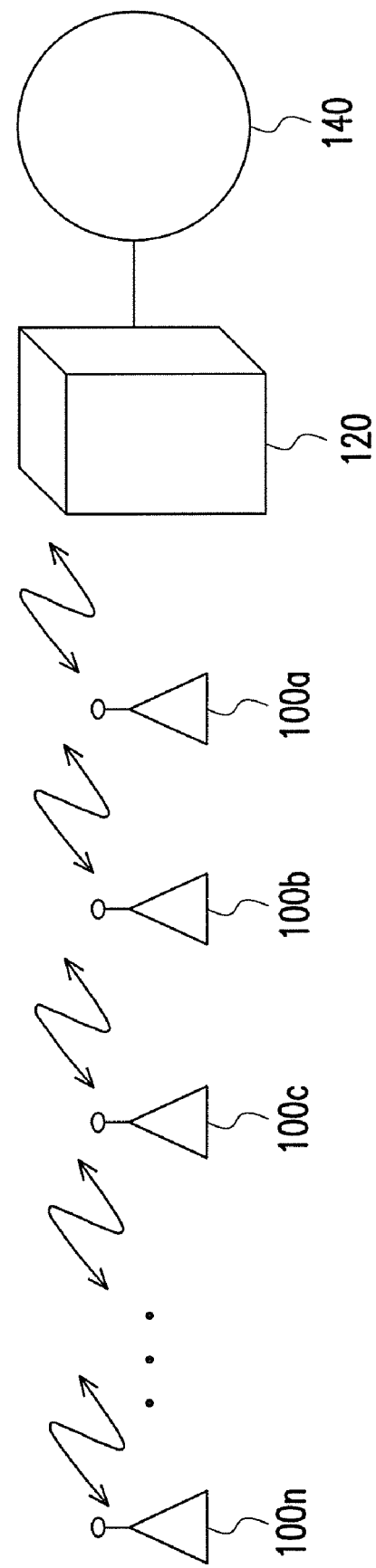
FIG. 1A is a schematic environment diagram of a multi-hop wireless backhaul network adopting a chain topology.

Descriptions of the present invention are given with reference to the embodiments illustrated with accompanied drawings wherein same or similar parts are denoted with same reference numerals.

According to an embodiment of the present invention, a call admission control method in a multi-hop wireless backhaul network is provided.

FIG. 1A is a schematic environment diagram of a multi-hop wireless backhaul network adopting a chain topology. The environment of the multi-hop wireless backhaul network adopting a chain topology uses a ripple protocol as a media access control protocol. A feature of the ripple protocol is that only after a relay node in the wireless chain network obtains a token can the relay node with the obtained token transmit a data frame. The token in the ripple protocol refers to a request-to-send (RTS) frame and a ready-to-receive frame. If there is no data frame in the queue when the relay node receives the token, a null frame having the same size as that of the data frame needs to be transmitted.

Under the operation of the ripple protocol, with the exception of an initial state or an error, any relay node may only operate under one operation state as described hereafter at any time. Each relay node, under a stable condition, sequentially cycles among three states, receiving (Rx), transmitting (Tx), and listening (listen). When every relay node is under a stable condition, because the system repeatedly cycles through the three states, duration of each state is fixed to be service time T of a single frame. For example, the service time T of a single frame is equal to a sum of time $T_{RTS}$ of transmitting an RTS frame, time $T_{CTS}$ of transmitting a CTS (clear-to-send) frame, time $T_{DATA}$ of transmitting data, time $T_{ACK}$ of transmitting an acknowledgement frame, and time $T_{SIFS}$ of four short interframe spaces ($T=T_{RTS}+T_{CTS}+T_{DATA}+T_{ACK}+4*T_{SIFS}$).

The chain wireless backhaul network includes more than one relay node $100a$, $100b$, $100c$, ..., $100n$, a gateway 120, and the Internet 140. As shown in FIG. 1A, each relay node in the chain wireless backhaul network is wirelessly inter-connected as a chain topology and is also wirelessly connected to the gateway 120. The IEEE 802.11a protocol in a 5 GHz frequency band may be adopted for communication among the relay nodes $100a$, $100b$, $100c$, ..., and $100n$. The IEEE 802.11a protocol in a 5 GHz frequency band may also be adopted for the communication between the relay node $100a$ and the gateway. As shown in FIG. 1A, service data of the relay node $100n$ is relayed via multi-hop to the gateway 120 which is connected to the Internet 140 via a wired connection and also transmits and receives service data between the multi-hop wireless backhaul network and the Internet.

Figure 1B:
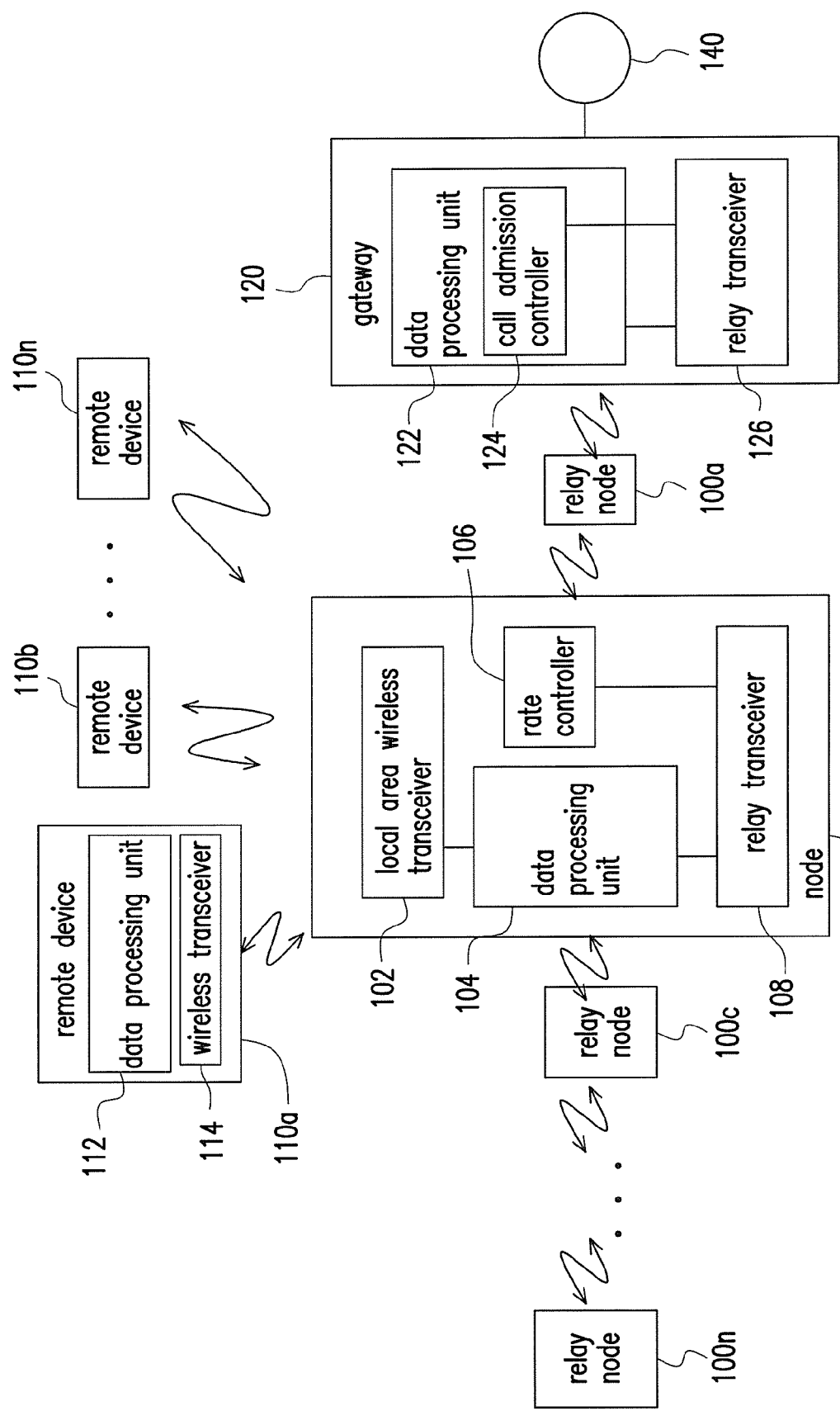
FIG. 1B is a system structural diagram of a multi-hop wireless backhaul network adopting a chain topology according to an embodiment of the present invention.

FIG. 1B is a system structural diagram of a multi-hop chain wireless backhaul network according to an embodiment of the present invention. Part of the description of FIG. 1B may be referred from the related illustration on FIG. 1A and will not be further described again herein. Any relay node (e.g. relay node $100b$) in the chain wireless backhaul network system includes an area wireless transceiver 102, an data processing unit 104, a rate controller 106, and a relay transceiver 108. The IEEE 802.11a protocol in a 5 GHz frequency band may be adopted for communication among the relay nodes. The data processing unit 104 processes the service data entering the relay node $100b$, and includes a temporarily memory for storing the service data which can not be transmitted. The rate controller 106 controls the transmission rate of the service data entering the relay node $100c$ from the relay node $100b$. The relay transceiver 108 is for receiving and transmitting service data among the relay nodes.

As shown in FIG. 1B, each of a plurality of remote devices $110a$, $110b$, ..., and $110n$ includes an data processing unit 112 and a wireless transceiver 114. As shown in FIG. 1B, the remote device $110a$ is wirelessly connected to the area wireless transceiver 102 of the relay node $100b$ via the wireless transceiver 114. The relay node $100b$ is wirelessly connected to one or more remote devices via the area wireless transceiver 102. The IEEE 802.11b/g in a 2.4 GHz frequency band may be adopted for communication among each of the relay nodes and the remote devices. The remote device $110a$ transmits the service data generated by the data processing unit 112 to the relay node $100b$.

As shown in FIG. 1B, service data of the relay node $100b$ is relayed to the gateway 120 via multi-hopping over the relay nodes. The gateway 120 includes an data processing unit 122, a call admission controller 124, and a relay transceiver 126. The data processing unit 122 processes the service data which is admitted and transmits the service data to the Internet 140. The relay transceiver 126 receives service data entering the gateway 120. The call admission controller 124 determines whether to allow service data of a relay node to enter. For example, the call admission controller 124 does not allow the service data of the relay node $100b$ to enter. Then, the data processing unit 104 of the relay node $100b$ temporarily stores the service data that is unable to be transmitted.

Figure 2:
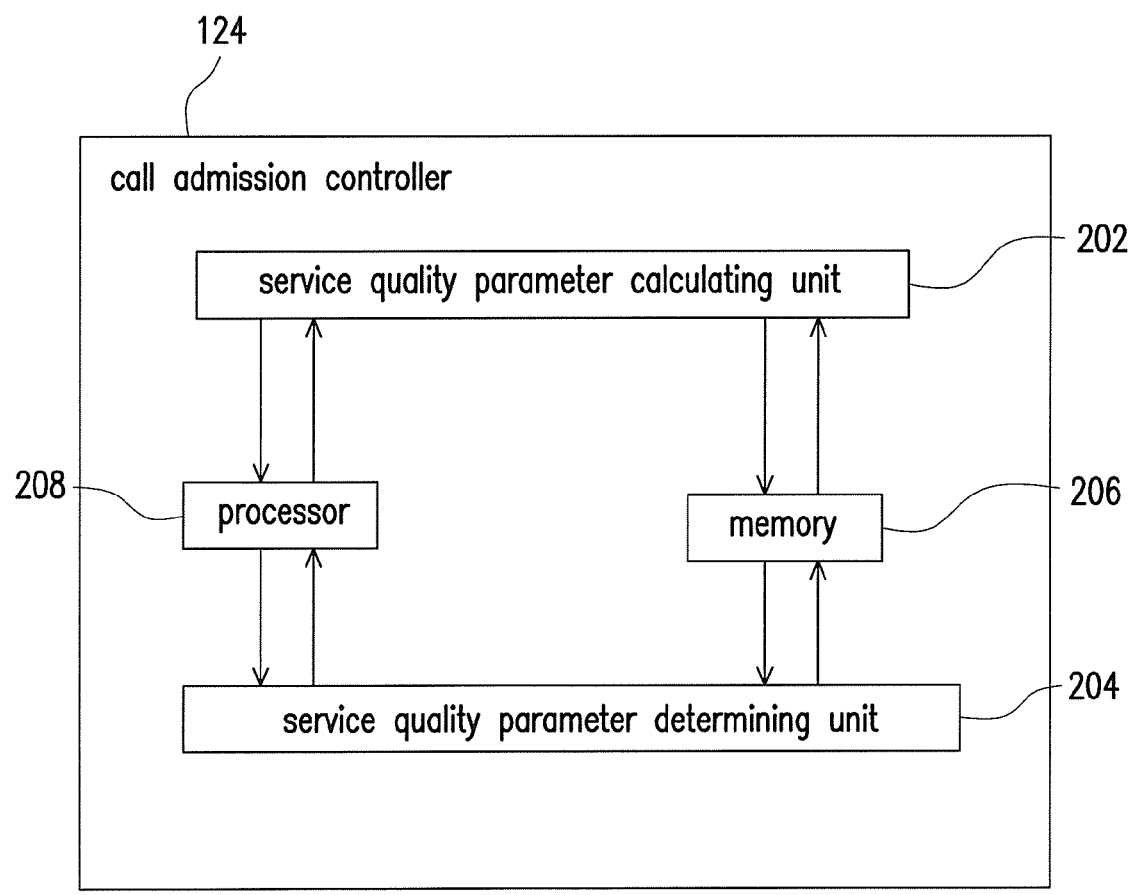
FIG. 2 is a system structural diagram of a call admission controller according to an embodiment of the present invention.

FIG. 2 is a system structural diagram of a call admission controller 124 according to an embodiment of the present invention. The call admission controller 124 includes a service quality parameter calculating unit 202, a service quality parameter determining unit 204, a memory module 206, and a processor 208. The service quality parameter calculating unit 202 calculates service quality parameters in the network and performs further processes according to the service quality parameters. The service quality parameter determining unit 204 makes a determination according to the parameters processed by the service quality parameter calculating unit 202 and decides whether to allow the new service data to enter the gateway. The memory 206 may store a program module which performs one or more processes of a media generating program when executed by the processor 208. The memory 202 may be one or more memory devices for storing data and software programs and may include, for example, one or more of a RAM, ROM, magnetic storage device, or optical storage device. The processor 208 may be a processor configured to execute program modules. In the present embodiment, the technical means of the call admission control method will be illustrated in reference to FIGS. 4-6. However, the above-mentioned description of embodiments is not intended to limit the scope of the present invention. Simply speaking, concept of the present invention lies in calculating at least a service quality parameter of the multi-hop wireless backhaul network and determining whether the service data to be transmitted by the relay node may enter the gateway according to the at least one service quality parameter.

Figure 3:
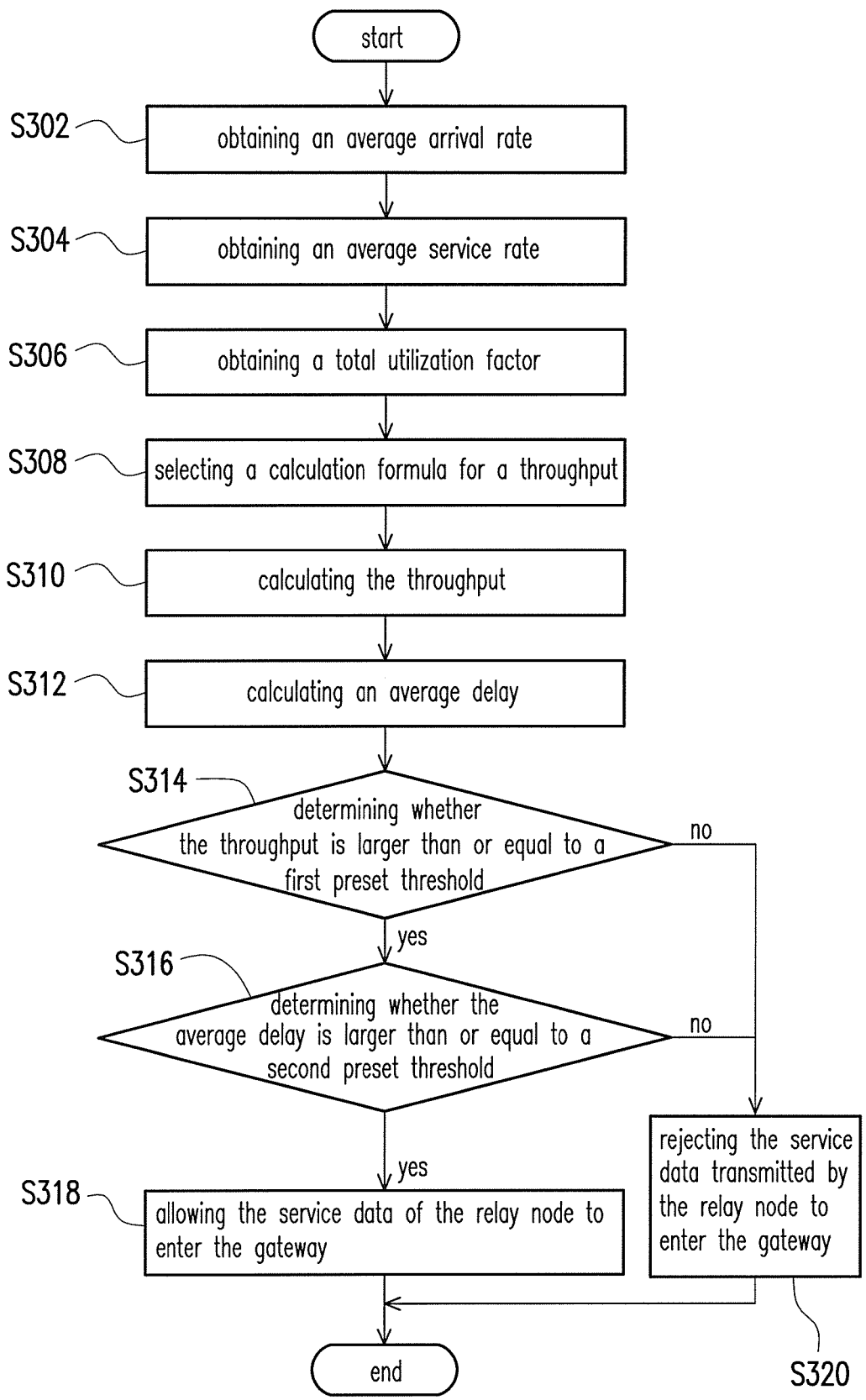
FIG. 3 is a flow chart of a call admission control method of a single class traffic according to an embodiment of the present invention.

FIG. 3 is a flow chart of a call admission control method according to an embodiment of the present invention. The call admission control method is designed for a multi-hop chain wireless backhaul network adopting single class traffic. It should be mentioned that the sequence of the steps of the call admission control method as described below is not necessarily fixed and some of the steps may be exchanged or simultaneously performed. First of all, in step S302, the service quality parameter calculating unit 202 of the call admission controller 124 obtains an average arrival rate $\lambda_1$ of the service data packets transmitted to the gateway 120 from each of the relay nodes, wherein the unit of the average arrival rate $\lambda_1$ is packets/second.

Next, in step S304, the service quality calculating unit 202 obtains an average service rate $\mu$ of each of the relay nodes. The unit of the average service rate $\mu$ is packets/second.

Then, in step S306, the service quality calculating unit 202 obtains a total utilization factor $\rho$ parameter which has no unit. The service quality calculating unit 202 calculates the total utilization factor $\rho$ according to equation (1) as follows.

$$\rho = \frac{\sum_{i=1}^{n} \lambda_{i,1}}{\mu}, \quad \text{(Equation 1)}$$

wherein $\lambda_{i,1}$ represents the average arrival rate of traffic in the $i^{th}$ relay node and n represents the total number of relay nodes. In other words, in the present example, the total utilization factor $\rho$ is a ratio between the average arrival rate $\lambda_1$ and the average service rate $\mu$.

In step S308, the service quality parameter calculating unit 202 chooses a calculation formula for a throughput $g_1$ based on the obtained total utilization factor $\rho$, and the unit of the throughput $g_1$ is bits/second.

In step S310, if the total utilization factor $\rho$ is smaller than 1, the calculation formula is equation (2) (as shown below), and the service quality parameter calculating unit 202 calculates the throughput $g_1$ according to equation (2) and a data packet length $L_{DATA}$, wherein the equation (2) is cited as:

$$g_1 = \left(\sum_{i=1}^{n} \lambda_{i,1}\right) \times L_{DATA}. \quad \text{(Equation 2)}$$

On the contrary, if the total utilization factor $\rho$ is larger than or equal to 1, the calculation formula is equation (3) (as shown below), and the service quality parameter calculating unit 202 calculates the throughput $g_1$ according to equation (3), wherein the equation (3) is cited as:

$$g_1 = \mu \times L_{DATA}. \quad \text{(Equation 3)}$$

Furthermore, in step S312, the service quality parameter calculating unit 202 calculates an average delay $W_1$ of single class traffic according to the above-mentioned service time T of a single frame and equation (4) (as shown below), wherein the equation (3) is cited as:

$$W_1 = \frac{3T}{2\left(1 - 3T\sum_{i=1}^{n} \lambda_{i,1}\right)} + \sum_{i=1}^{n} \frac{i\lambda_{i,1}T}{\lambda_1}. \quad \text{(Equation 4)}$$

In step S312, the unit of the average delay $W_1$ is seconds. The above-mentioned calculation equations of the throughput $g_1$ and the average delay $W_1$ are provided for example only. The service quality parameter calculating unit 202 may also calculate the throughput $g_1$ and the average delay $W_1$ by other calculation formulae.

In step S314, the service quality parameter determining unit 204 determines whether the throughput $g_1$ is larger than a first preset threshold. For example, a first threshold of the throughput $g_1$ may be $1 \times 10^9$ (bits/second). If the throughput $g_1$ is larger than the first preset threshold, then the subsequent step S316 is carried out. If the throughput $g_1$ is smaller than the first preset threshold, then in step S320, the call admission controller 124 will not allow the service data transmitted by the relay node to enter the gateway 120.

In step S316, the service quality parameter determining unit 204 determines whether the average delay $W_1$ is smaller than a second preset threshold. If the average delay $W_1$ is smaller than the second preset threshold, then the subsequent step S318 is carried out. On the contrary, if the average delay $W_1$ is larger than the second preset threshold, then in step S320, the call admission controller 124 will not allow the service data transmitted by the relay node to enter the gateway 120. For example, if a second threshold of the average delay $W_1$ is 10 milliseconds and the service data to be transmitted by the relay node will cause the average delay $W_1$ to become 20 milliseconds, then the call admission controller 124 will not allow the service data to be transmitted by the relay node to enter the gateway 120.

In step S318, the call admission controller 124 allows the service data to be transmitted by the relay node to enter the gateway 120. The embodiments of the present invention are limited to the embodiments as illustrated above. Although the service quality parameter are illustrated as the throughput and the average delay for example, in fact, the service quality parameter may also be the total number of remote devices, the amount of service data in a specific class traffic, etc. For example, when the call admission controller 124 knows that the total number of the remote devices exceeds a particular number, the call admission controller 124 will not allow the service data to be transmitted by the relay node to enter the gateway 120. For example again, when the call admission controller 124 knows that the amount of service data in a specific class traffic exceeds a particular amount, the call admission controller 124 will not allow the service data to be transmitted by the relay node to enter the gateway 120.

In addition, although the above embodiment determines whether to allow the service data to enter the gateway by considering both of the throughput and the average delay, the present invention is not limited thereto. As a matter of fact, the call admission controller 124 may consider only the throughput or only the average delay. The call admission controller 124 may also consider the throughput and the total number of the remote devices. Furthermore, the call admission controller 124 may also determine if the service quality parameter decreases or increases to decide on whether to allow the service data to enter the gateway 120. For example, if a current throughput is lower than a previous throughput, then the service data will not be allowed to enter the gateway 120. For example again, if a current average delay is higher than a previous average delay, then the service data will not be allowed to enter the gateway 120. Simply speaking, the call admission controller 124 may decide on whether to allow the service data to enter the gateway 120 according to at least one service quality parameter and the determination method of whether to allow the service data to enter the gateway 120 may be designed according to various environments.

Furthermore, in order to perform call admission control on the multi-hop wireless backhaul network with classified multiple class traffic, technical means of a call admission control method for multiple class traffic incorporating strict priority are illustrated below with reference to FIG. 4.

Figure 4:
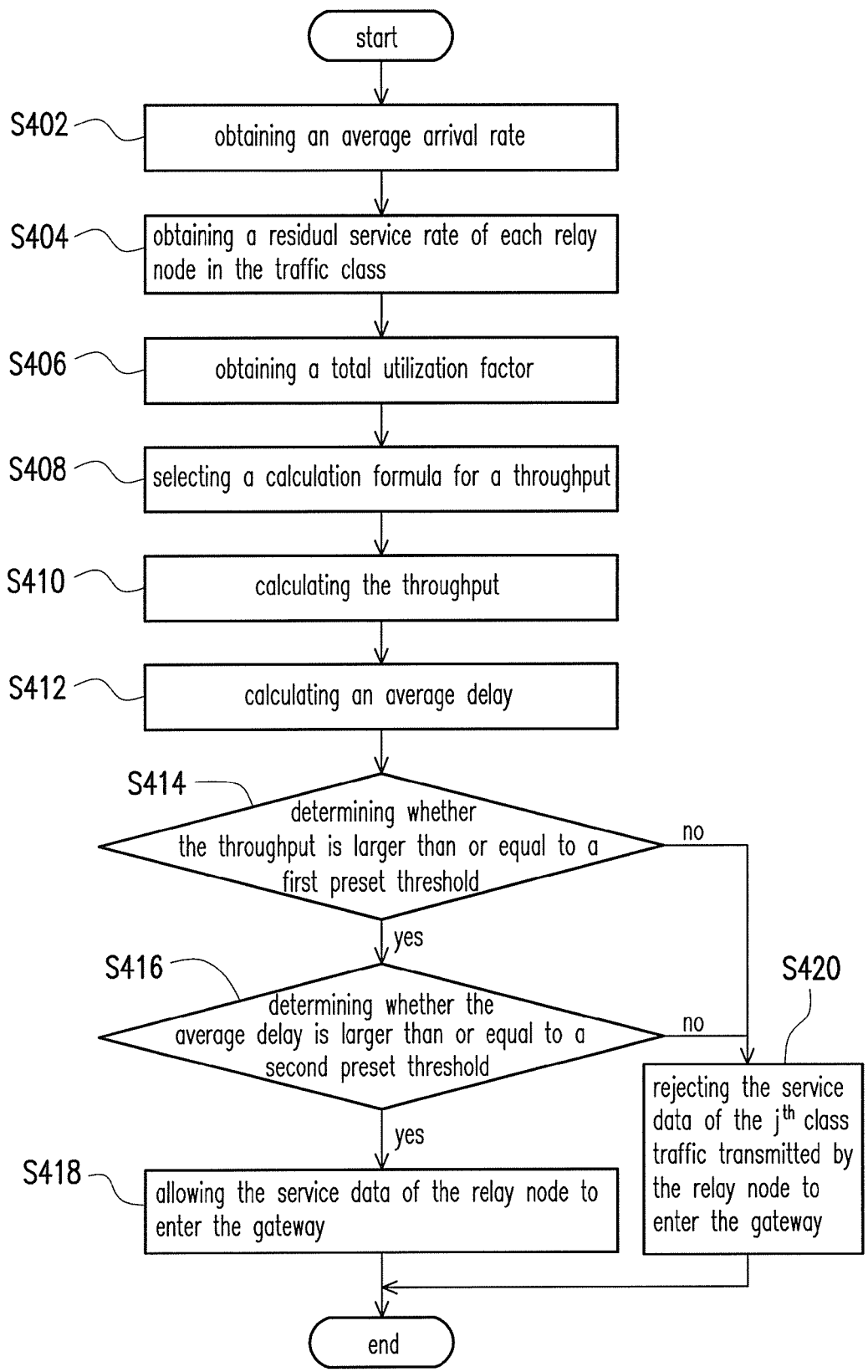
FIG. 4 is a flow chart of a call admission control method of a multiple class traffic incorporating strict priority according to an embodiment of the present invention.

FIG. 4 is a flow chart of a call admission control method of a multiple class traffic incorporating strict priority according to an embodiment of the present invention. Strict priority refers to the separation of the classified multiple class traffic into different priorities. The classes of traffic with different priorities may have different preset thresholds. The $j^{th}$ class traffic group in the entire network system is assumed to have the $j^{th}$ priority (i.e. the $j^{th}$ priority class).

First in step S402, the service quality parameter calculating unit 202 of the call admission controller 124 obtains an average arrival rate $\lambda_j$ of the service data packets transmitted by each of the relay nodes in the $j^{th}$ class traffic group to the gateway.

Next, in step S404, the service quality parameter calculating unit 202 obtains a residual service rate $\mu_j$ of each of the relay nodes in the $j^{th}$ class traffic group.

Then, in step S406, the service quality parameter calculating unit 202 obtains a total utilization factor ρ parameter. The call admission controller 124 calculates the total utilization factor ρ according to equation (5). Equation (5) is cited as follows:

$$\rho = \frac{\sum_{i=1}^{n}\sum_{j=1}^{m}\lambda_{i,j}}{\mu},$$

(Equation 5)

wherein $\lambda_{i,j}$ represents the average arrival rate of the $j^{th}$ class traffic in the $i^{th}$ relay node, n represents the total number of relay nodes, and m represents the amount of the multiple class traffic (i.e. m is a total number of the classes of traffic). In the present example, the total utilization factor ρ is a ratio between the total of the average arrival rate $\lambda_{i,j}$ of each traffic class in each relay node to the average service rate μ.

In step S408, the service quality parameter calculating unit 202 selects a calculation formula for the throughput $g_j^{(sp)}$ of the $j^{th}$ traffic class group according to the obtained total utilization factor ρ.

In step S410, if the total utilization factor ρ is smaller than 1, the calculation formula is equation (6) (as shown below). Then the service quality parameter calculating unit 202 calculates the throughput $g_j^{(sp)}$ of the $j^{th}$ class traffic group according to equation (6) (as shown below) and a data packet length $L_{DATA}$. Equation (6) is cited as follows:

$$g_j^{(SP)} = \left(\sum_{i=1}^{n}\lambda_{i,j}\right) \times L_{DATA}.$$

(Equation 6)

On the contrary, if the total utilization factor ρ is larger than or equal to 1, the calculation formula is equation (7) (as shown below). Then the service quality parameter calculating unit 202 calculates the throughput $g_j^{(sp)}$ of the $j^{th}$ class traffic group according to equation (7) (as shown below) and the data packet length $L_{DATA}$. Equation (7) is cited as follows:

$$g_j^{(sp)} = \mu_j \times L_{DATA}$$

(Equation 7).

Next, in step S412, the service quality parameter calculating unit 202 calculates an average delay $W_j^{(SP)}$ of the $j^{th}$ class traffic group according to the above-mentioned service time T of a single frame and equation (8), wherein equation (8) is cited as follows:

$$W_j^{(SP)} = \frac{3T}{2\left(1-3T\sum_{k=1}^{j-1}\lambda_{i,k}\right)\left(1-3T\sum_{k=1}^{j}\lambda_{i,k}\right)} + \sum_{i=1}^{n}\frac{i\lambda_{i,j}T}{\lambda_j}.$$

(Equation 8)

In step S414, as in the above call admission control method for single class traffic, if the service quality parameter determining unit 204 determines that the throughput $g_j^{(sp)}$ of the $j^{th}$ class traffic group is larger than or equal to a first preset threshold (i.e. a preset throughput threshold) of the $j^{th}$ class traffic group, the subsequent step S416 is carried out. If the throughput $g_j^{(sp)}$ of the $j^{th}$ class traffic group is smaller than the preset throughput threshold of the $j^{th}$ class traffic group, then in step S420, the call admission controller 124 will not allow the service data of the $j^{th}$ class traffic group to be transmitted by the relay node to enter the gateway 120.

In step S416, if the average delay $W_j^{(SP)}$ of the $j^{th}$ class traffic group is smaller than or equal to a second preset threshold (i.e. a preset average delay threshold) of the $j^{th}$ class traffic group, the subsequent step S418 is carried out. On the contrary, if the average delay $W_j^{(SP)}$ of the $j^{th}$ class traffic group is larger than the preset average delay threshold of the $j^{th}$ class traffic group, then the call admission controller 124 will not allow new service data of the $j^{th}$ class traffic group to enter the gateway 120. For example, the threshold of the average delay $W_j^{(SP)}$ of the $j^{th}$ class traffic group may be 10 milliseconds and the service data of the $j^{th}$ class traffic group to be transmitted by the relay node will cause the average delay $W_j^{(SP)}$ to become 20 milliseconds, then the call admission controller 124 will not allow the service data of the $j^{th}$ class traffic group to be transmitted by the relay node to enter the gateway 120.

In step S418, the call admission controller 124 allows the service data of the $j^{th}$ class traffic group to be transmitted by the relay node to enter the gateway 120.

The above embodiment is certainly not intended to limit the scope of the present invention. The call admission controller 124 as provided in the embodiment of the present invention may also adopt a wireless backhaul network of multiple class traffic incorporating weighted fair queuing.

Figure 5:
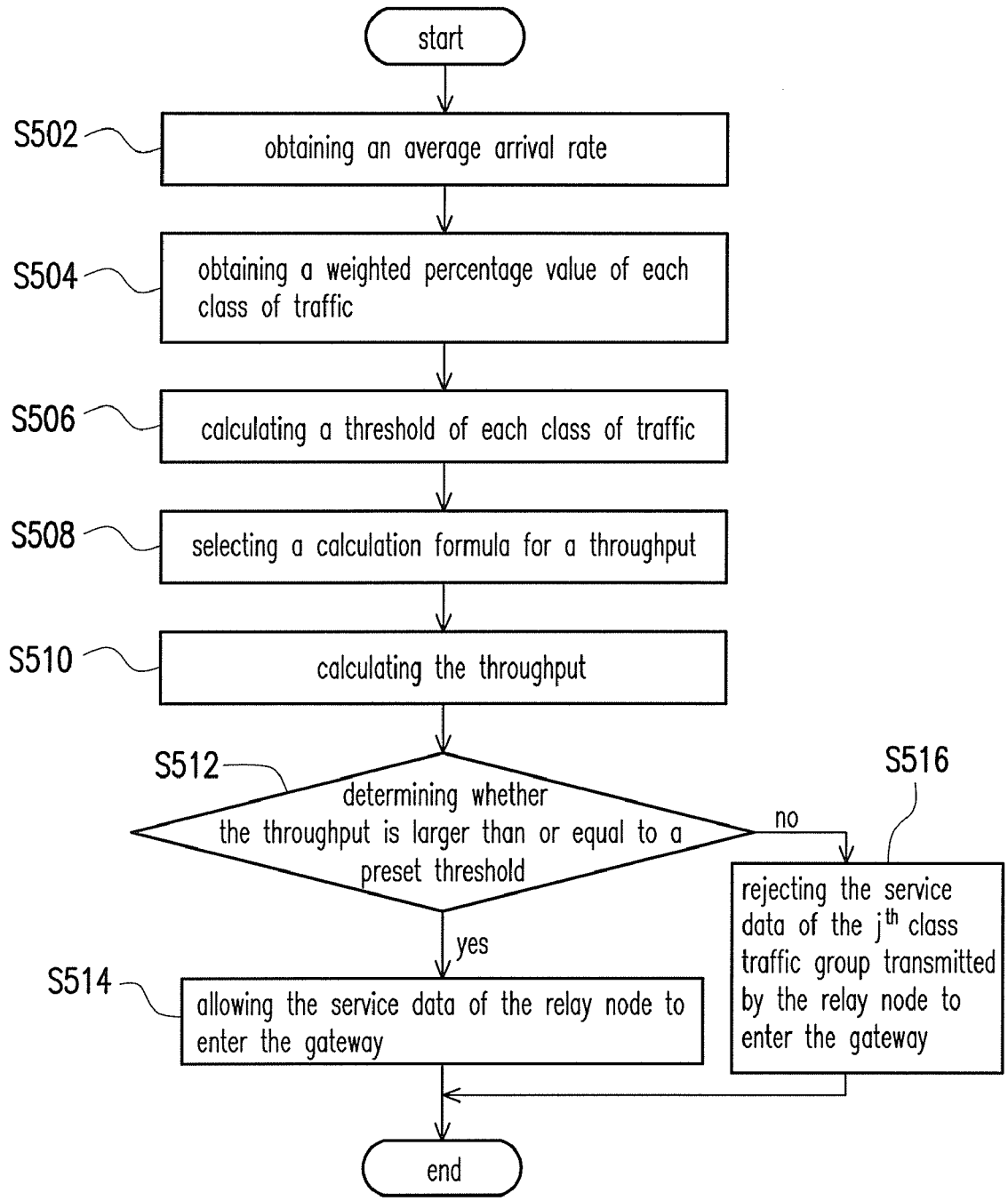
FIG. 5 is a flow chart of a call admission control method of a multiple class traffic incorporating weighted fair queuing according to an embodiment of the present invention.

FIG. 5 is a flow chart of a call admission control method for multiple class traffic incorporating weighted fair queuing according to an embodiment of the present invention. Under the classification of multiple class traffic by weighted fair queuing, it is not only that the relay nodes are classified by traffic class but the traffic classes are also further sorted by unit arrival flow $(\lambda_j/\phi_j)$ defined by a weighted percentage value $\phi_j$ of each traffic class. The weighted percentage value $\phi_j$ of the $j^{th}$ traffic class is set for reserving network bandwidth for the $j^{th}$ traffic class and may be set by the network administrator of the wireless backhaul network or the Internet service provider. In the sorted list according to the unit arrival flow, the smallest is the $1^{st}$ class, the next is the $2^{nd}$ class, and so on. The classes are sorted by weighted fair queuing so an average service rate for each class is different.

First in step S502, the service quality parameter calculating unit 202 of the call admission controller 124 obtains an average arrival rate λ of the service data packets transmitted by each of the relay nodes to the gateway.

Then, in step S504, the service quality parameter calculating unit 202 obtains a weighted percentage value for each traffic class, wherein the weighted percentage value for the $j^{th}$ class traffic is denoted as $\phi_j$.

Then, in step S506, the service quality parameter calculating unit 202 calculates m thresholds $T_k$ according to equation 9 (shown as follows), the average arrival rate λ, and the weighted percentage value $\phi_j$ of the traffic class. Equation (9) is cited as follows:

$$T_k = \sum_{j=1}^{k-1} \lambda_j + \frac{\lambda_k}{\varphi_k}\left(\sum_{j=k}^{m} \varphi_j\right), k = 1, 2, \ldots, m. \quad \text{(Equation 9)}$$

Figure 6:
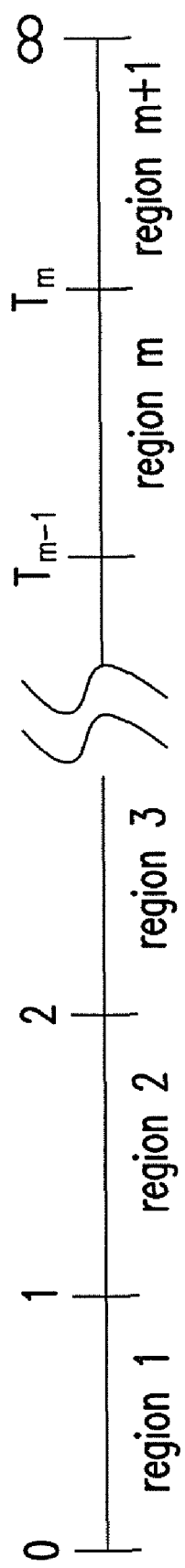
FIG. 6 is a schematic diagram illustrating determination rules for a throughput by weighted fair queuing according to an embodiment of the present invention.

Referring to FIGS. 5 and 6, FIG. 6 is a schematic diagram illustrating determination rules for throughput by weighted fair queuing according to an embodiment of the present invention. The m thresholds $T_k$ calculated in step S506 may correspond to thresholds $T_1, T_2, \ldots, T_{m-1}$, and $T_m$ of each sorted region in FIG. 6.

Next, in step S508, the service quality parameter calculating unit 202 decides a calculation formula for calculating throughput by weighted fair queuing according to the region the current service rate falls in.

In step S510, if the average service rate μ is smaller than the threshold $T_{k+1}$ of the next region and larger than or equal to the threshold $T_k$ of the current region, the calculation formula is equation (10) (as shown below). Then the service quality parameter calculating unit 202 calculates an average throughput $g_j^{(WFQ)}$ of the $j^{th}$ class traffic group according to equation (10) (as shown below), the data packet length $L_{DATA}$, the arrival rate λ, and the weight of the traffic class. Equation (10) is cited as follows:

$$g_j^{(WFQ)} = \begin{cases} \lambda_j \times L_{DATA}, & \text{if } 1 \le j \le k \\ \left(\mu - \sum_{h=1}^{k} \lambda_h\right) \times \frac{\varphi_j}{\sum_{h=k+1}^{m} \varphi_h} \times L_{DATA}, & \text{if } k < j \le m. \end{cases} \quad \text{(Equation 10)}$$

If the average service rate μ is smaller than the threshold $T_1$ of the first region, the calculation formula is equation (11) (as shown below). Then the service quality parameter calculating unit 202 calculates the throughput $g_j^{(WFQ)}$ of the $j^{th}$ class traffic group according to equation (11). Equation (10) is cited as follows:

$$g_j^{(WFQ)} = \mu \times \frac{\varphi_j}{\sum_{h=1}^{m} \varphi_h} \times L_{DATA}, \text{if } 1 \le j \le m. \quad \text{(Equation 11)}$$

If the average service rate μ is larger than or equal to the threshold $T_m$ of the final region (i.e. the $m^{th}$ region), the calculation formula is equation (12). Then the service quality parameter calculating unit 202 calculates the throughput $g_j^{(WFQ)}$ of the $j^{th}$ class traffic according to equation (12). Equation (12) is cited as follows:

$$g_j^{(WFQ)} = \lambda_j \times L_{DATA}, \text{if } 1 \le j \le m \quad \text{(Equation 12)}.$$

In step S512, similar to the above-mentioned call admission control method for single class traffic, if the service quality parameter determining unit 204 determines that the throughput $g_j^{(WFQ)}$ of the $j^{th}$ class traffic group is larger than or equal to the preset throughput threshold of the $j^{th}$ class traffic group, the subsequent step S514 is carried out. On the contrary, if the throughput $g_j^{(WFQ)}$ of the $j^{th}$ class traffic group is smaller than the preset throughput threshold of the $j^{th}$ class traffic group, then in step S516, the call admission controller 124 will not allow the service data of the $j^{th}$ class traffic group to be transmitted by the relay node to enter the gateway 120. In step S514, the call admission controller 124 allows the service data of the $j^{th}$ class traffic group to be transmitted by the relay node to enter the gateway 120.

Figure 7:
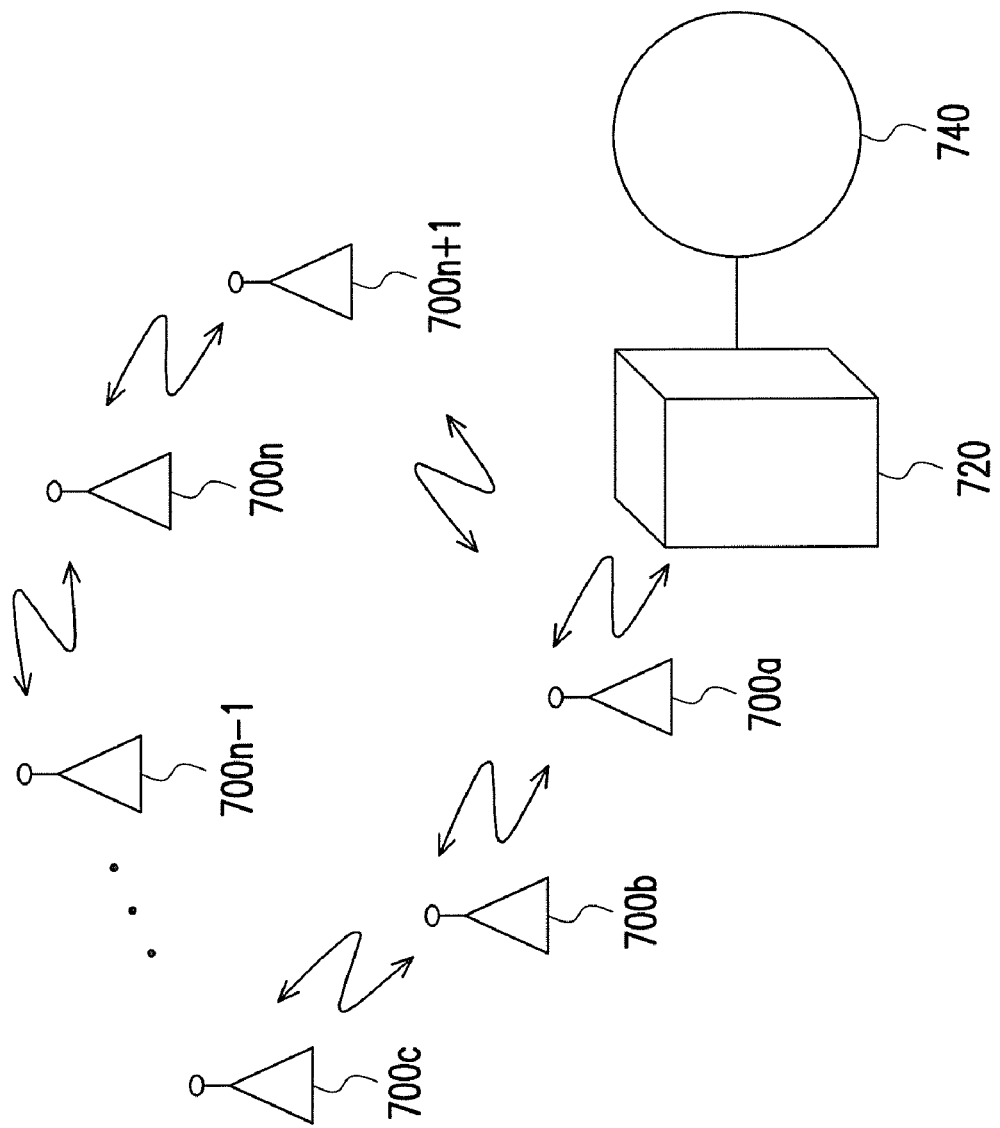
FIG. 7 is a system structural diagram of a multi-hop wireless backhaul network adopting a ring topology according to an embodiment of the present invention.

FIG. 7 is a system structural diagram of a multi-hop wireless backhaul network adopting a ring topology according to an embodiment of the present invention. The ring multi-hop wireless backhaul network includes one or more relay nodes 200a, 200b, 200c, . . . , 200n−1, 200n, and 200n+1, a gateway 220, and the Internet 240. The ring multi-hop wireless backhaul network may also use a ripple protocol as a media access control protocol. The relay nodes in the ring multi-hop wireless backhaul network can transmit a data frame only after obtaining a token. However, a difference between the ring multi-hop wireless backhaul network and the chain multi-hop wireless backhaul network in FIG. 1 lies in that the ring multi-hop wireless backhaul network may relay service data flow among the relay nodes in a clockwise or counterclockwise direction. The direction of relaying service data flow among the relay nodes in the ring multi-hop wireless backhaul network depends on the network setting. Therefore, the above-mentioned various call admission methods are applicable in the ring multi-hop wireless backhaul network. In addition, the above-mentioned various call admission methods are also applicable in multi-hop wireless backhaul networks adopting other topologies such as a tree-topology multi-hop wireless backhaul network.

Call admission control methods of a multi-hop wireless backhaul network are not limited to the above-mentioned. The gateway may also determine whether to allow new service data of relay nodes in the multi-hop wireless backhaul network to enter the gateway according to other service quality parameters. The service quality parameter may also be a packet loss rate, a number of remote devices, a number of relay nodes, and other common parameters in network service quality evaluation.

In addition, the call admission methods of a multi-hop wireless backhaul network provided by the embodiments of the present invention may also be applicable for various multi-hop network using time scheduling such as a network adopting IEEE 802.16j multi-hop relay communication protocol. Each relay node in this type of network uses time division multiplexing to serve data frames. Thus, service time T of a single frame is the same in the entire network. In other words, the average service rate μ is a fixed value. Therefore, the call admission control method provided by the embodiment of the present invention only needs to modify the service time T or the average service rate μ so as to be applicable for various multi-hop networks using time scheduling.

In summary, in the embodiments of the present invention, a determination on whether to allow service data of a relay node to enter the gateway is made according to at least one service quality parameter of the multi-hop wireless backhaul network. Accordingly, capacity and overall efficiency of the multi-hop wireless backhaul network can be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A call admission control method, for a multi-hop wireless backhaul network comprising a plurality of relay nodes and a gateway, wherein the call admission control method comprises:

using a service quality parameter calculating unit to calculate at least one service quality parameter of the multi-hop wireless backhaul network;

using a service quality parameter determining unit to determine whether to allow service data transmitted by one of the relay nodes to enter the gateway according to the at least one service quality parameter, wherein the multi-hop wireless backhaul network adopts a ripple protocol as a media access control protocol thereof; and when a traffic type of the service data adopts single class traffic and the service quality parameter comprises a throughput, the step of using the service quality parameter calculating unit to calculate the service quality parameter comprises:

obtaining an average arrival rate, an average service rate, and a data packet length;

obtaining a total utilization factor according to the average arrival rate and the average service rate;

determining a calculation formula for the throughput according to the total utilization factor as a first formula or a second formula;

calculating the throughput according to the data packet length and the average arrival rate with the first formula when the total utilization factor is smaller than 1; and calculating the throughput according to the data packet length and the average service rate with the second formula when the total utilization factor is larger than or equal to 1.

2. The call admission control method according to claim 1, wherein a topology of the multi-hop wireless backhaul network is a chain topology, a ring topology, or a tree topology.

3. The call admission control method according to claim 1, wherein when a traffic type of the service data adopts single class traffic and the service quality parameter further comprises an average delay, the step of using the service quality parameter calculating unit to calculate the service quality parameter comprises:

obtaining service time of a single frame and a plurality of arrival rates of single class traffic of a plurality of relay nodes; and calculating the average delay according to the service time of the single frame and the arrival rates of single class traffic of the relay nodes.

4. A call admission control method, for a multi-hop wireless backhaul network comprising a plurality of relay nodes and a gateway, wherein the call admission control method comprises:

using a service quality parameter calculating unit to calculate at least one service quality parameter of the multi-hop wireless backhaul network;

using a service quality parameter determining unit to determine whether to allow service data transmitted by one of the relay nodes to enter the gateway according to the at least one service quality parameter, wherein the multi-hop wireless backhaul network adopts a ripple protocol as a media access control protocol thereof; and when a traffic type of the service data adopts multiple class traffic incorporating strict priority and the service quality parameter comprises a plurality of throughputs of a plurality of classes of traffic, the step of using the service quality parameter calculating unit to calculate the service quality parameter comprises:

obtaining an average arrival rate, an average service rate, a data packet length, a residual service rate of the jth class traffic, and an average arrival rate of the jth class traffic, wherein j is an integer from 1 to m, and m is a total number of the classes of traffic;

obtaining a total utilization factor according to the average arrival rate and the average service rate;

determining a calculation formula for the throughput of the jth class traffic according to the total utilization factor as a first formula or a second formula;

calculating the throughput of the jth class traffic according to the data packet length and the average arrival rate of the jth class traffic when the calculation formula for the throughput of the jth class traffic is the first formula; and calculating the throughput of the jth class traffic according to the data packet length and the residual service rate of the jth class traffic when the calculation formula for the throughput of the jth class traffic is the second formula.

5. The call admission control method according to claim 4, wherein a topology of the multi-hop wireless backhaul network is a chain topology, a ring topology, or a tree topology.

6. The call admission control method according to claim 4, wherein when the service quality parameter further comprises a plurality of average delays of a plurality of classes of traffic, the step of using the service quality parameter calculating unit to calculate the service quality parameter comprises:

obtaining service time of a single frame and a plurality of arrival rates of the multiple classes of traffic of the relay nodes; and calculating the average delay of the jth class traffic according to the service time of the single frame and the arrival rates of the multiple classes of traffic of the relay nodes, wherein j is an integer from 1 to m, and m is a total number of the classes of traffic.

7. A call admission control method, for a multi-hop wireless backhaul network comprising a plurality of relay nodes and a gateway, wherein the call admission control method comprises:

using a service quality parameter calculating unit to calculate at least one service quality parameter of the multi-hop wireless backhaul network;

using a service quality parameter determining unit to determine whether to allow service data transmitted by one of the relay nodes to enter the gateway according to the at least one service quality parameter, wherein the multi-hop wireless backhaul network adopts a ripple protocol as a media access control protocol thereof; and when a traffic type of the service data adopts multiple class traffic incorporating weighted fair queuing and the service quality parameter comprises a plurality of throughputs of a plurality of classes of traffic, the step of using the service quality parameter calculating unit to calculate the service quality parameter comprises:

obtaining an average service rate, a data packet length, a plurality of average arrival rates of the multiple classes of traffic, and a plurality of weighted percentage values of the multiple classes of traffic, wherein j is an integer from 1 to m, and m is the total of the classes of traffic;

calculating a threshold of the kth class traffic according to the weighted percentage values of the classes of traffic and the average arrival rates of the classes of traffic, wherein k is an integer from 1 to m;

determining a calculation formula for the throughput of the jth class traffic according to the thresholds of the classes of traffic and the average service rate as a first formula, a second formula, or a third formula;

calculating the throughput of the jth class traffic according to the average arrival rate of the jth class traffic and the data packet length when the calculation formula for the throughput of the jth class traffic is the first formula and j is an integer from 1 to k; calculating the throughput of the jth class traffic according to the average service rate, the data packet length, and the average arrival rates of the classes of traffic, and the weighted percentage values when the calculation formula for the throughput of the jth class traffic is the first formula and j is an integer from k to m;

calculating the throughput of the jth class traffic according to the average service rate, the data packet length, and the weighted percentage values of the classes of traffic when the calculation formula for the throughput of the jth class traffic is the second formula; and determining the throughput of the jth class traffic according to the data packet length and the average arrival rate of the jth class traffic when the calculation formula for the throughput of the jth class traffic is the third formula.

8. The call admission control method according to claim 7, wherein a topology of the multi-hop wireless backhaul network is a chain topology, a ring topology, or a tree topology.

* * * * *